Nov. 24, 1936.  P. GAISER  2,061,761
DIAPHRAGM GAUGE
Filed Sept. 24, 1931
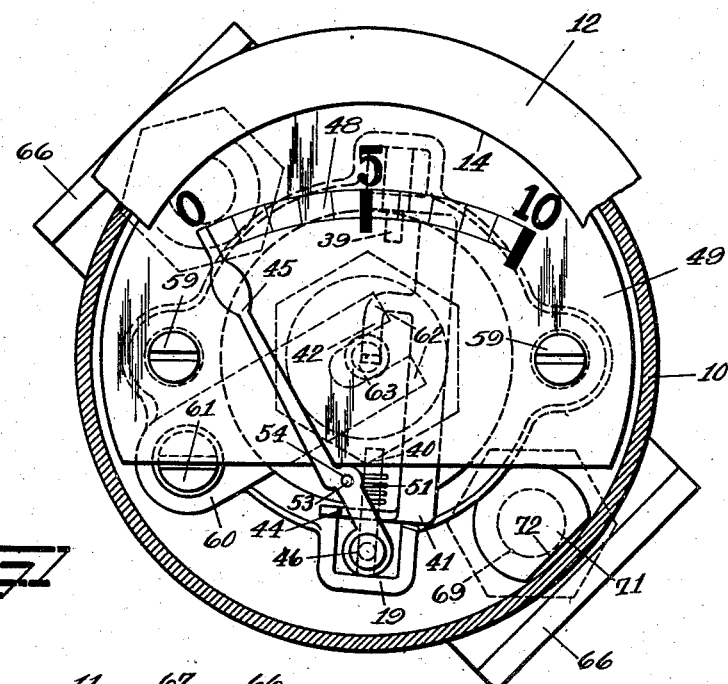
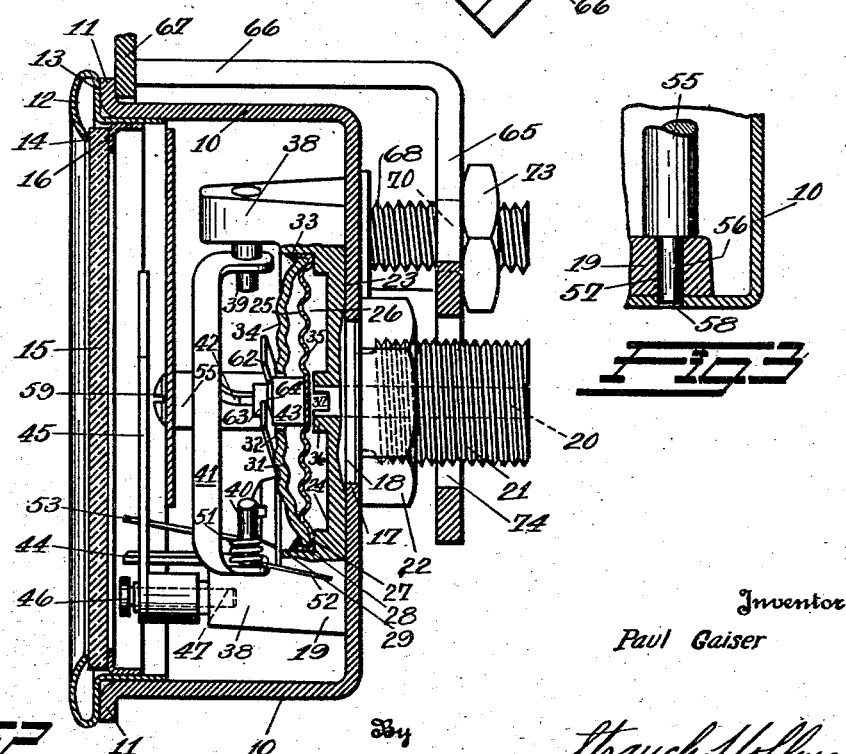
Inventor
Paul Gaiser
By
Strauch & Hoffman
Attorneys Patented Nov. 24, 1936

2,061,761

UNITED STATES PATENT OFFICE 2,061,761

DIAPHRAGM GAUGE

Paul Gaiser, Sellersville, Pa., assignor to United States Gauge Company, New York, N. Y., a corporation of Pennsylvania Application September 24, 1931, Serial No. 564,943

10 Claims. (Cl. 73—110)

The present invention relates to low pressure diaphragm gauges.

More specifically, the invention relates to pressure gauges for use in connection with automobiles for indicating the depth of gasoline in the tank; the depth of the water in the radiator, the depth of the oil in the crankcase, or the pressure existing in the pressure oil system, for example.

Diaphragm gauges of numerous varied designs have heretofore been constructed, in which a flexible metallic diaphragm, upon pressure-responsive movement thereof, imparted movement to a pointer or similar indicating means movable along a scale on the gauge dial.

In practice these gauges are frequently inadvertently subjected to excessive pressures or fluctuations in pressure, and it has been found that the diaphragms of the gauges now in use are frequently ruptured as a result. Moreover, these gauges are sometimes subjected to pressures below atmospheric pressure with the result that the diaphragms have been distorted rearwardly with damage thereto. These abnormal fluctuations also may cause bending of the pointer or its actuating members with the result that the pointer will not return to zero. The fact that the pointer actuating members have been bent or distorted destroys the accuracy of the gauge even though the pointer may be restored to zero by adjustment.

In some types of gauges now on the market, the journals for the various pointer actuating members are formed without sufficient strength or accuracy, as by stamping out of sheet metal. Such construction is found in practice to be unsatisfactory in that these various members are not given sufficient support. Accordingly the pointer actuating members are allowed too much freedom in their movements and the accuracy of the gauge is affected inasmuch as the pointer may give a certain reading under a given pressure in one instance and give a different reading at another time, the pressure in fact being the same as in the first instance.

Another disadvantage found in some of the gauges on the market today is that they are so designed that when it becomes necessary to make adjustments in the mechanism or repair parts of the device, it is found that disassembly of them is very difficult, and sometimes it is necessary to damage or actually destroy some of the parts in order to gain access to other parts contained in the casing.

In some gauges in use today the motions of the diaphragms thereof in response to pressure are resisted by various types of springs so that diaphragms of very light material may be used. These springs are usually inserted in the diaphragm case and bear against the diaphragm. The great drawback to this construction is that the springs are difficult of access, for adjustment and replacement.

It has further been found that in assembling gauges of this nature, the mechanism assembly is sometimes placed in the gauge casing in such a position that the dial is angularly displaced from the position it should assume, with the result that the gauge cannot be properly read, and must be disassembled in order to correct the position of the mechanism assembly with respect to the casing.

Accordingly it is an object of this invention to provide a gauge which will accurately indicate pressures under all sorts of adverse conditions, such as excessive pressures, and will withstand violent fluctuations in pressures without damage to its mechanism or in any way affecting the accuracy thereof.

Another object of the present invention is to provide a gauge that is so constructed that the movement of the diaphragm is definitely limited in both directions so that it will not be ruptured when subjected to excessive pressures or pressures below atmospheric.

It is also an object to devise an improved movement mechanism.

A further object of this invention is to provide a gauge wherein the journals for the pointer actuating members are of substantial relative size and rigid so that in use the pointer actuating members are not given too much latitude in their movements, with the result that the pressure indicated by the gauge shall be the actual pressure, and not some fictitious pressure reading that would result if lost motion or distortion existed in the pointer actuating members.

Another object of this invention is to provide a gauge that may be readily disassembled in the event that it becomes necessary to repair or adjust elements of the mechanism.

A still further object of this invention is to produce a gauge wherein yielding means are provided to resist the movements of the diaphragm in response to fluid pressure. The yielding means compels the diaphragm to take a smooth regular motion, thereby greatly assisting in obtaining an even scale calibration and assuring an instant return of the diaphragm to its normal position. This yielding means is of especially great value in a low pressure gauge in that, by its offering substantial resistance to the pressure responsive movement of the diaphragm, a diaphragm constructed of a very thin or soft material may be used. The advantages of an unusually soft or thin diaphragm are that it has extreme sensitivity and accuracy due to its low and uniform inherent resistance to movement. The diaphragms of gauges in the past have been constructed of such a material and in such a manner that they were quite rigid and offered substantial and non-uniform resistance to movement, and this resistance, unless compensated for, entered into the scale readings with the result that the readings did not give a true indication of the pressure throughout the entire scale range. The yielding means resisting the diaphragm movement preferably comprises a metal arm of such a nature and associated with the diaphragm in such a manner that it may be removed from the gauge without disturbing the diaphragm or any of the other related gauge parts.

Another object of this invention is to provide a gauge having a means carried thereby to efficiently secure it to the dash of an automobile or other supporting surface, so that the gauge may be quickly mounted thereon or removed therefrom, yet when in place is rigidly secured.

A still further object of the present invention is to provide a gauge wherein the gauge casing and mechanism assembly have interengaging parts of such a nature that, as the mechanism assembly is placed in the casing, their correct angular relationship is assured.

With these objects in view, as well as others that will become apparent from the following disclosure, reference will be had to the accompanying drawing forming part of the same and in which:

Figure 1 is a front view of my improved gauge with certain parts cut away in order to illustrate the mechanism in the casing.

Figure 2 is an elevation partly in section of the gauge and the attaching means, and Figure 3 is a detail view, partly in section, of the means for assuring the correct positioning of the mechanism in the casing.

Referring to the drawing, in which like characters designate like parts, 10 designates the gauge casing which preferably is of cylindrical formation, and is provided with an outturned flange 11 at the front open end thereof. The open end of this casing is closed by a unitary crystal assembly comprising a sleeve 12 so formed as to have a flange 13 which abuts the flange 11 on the casing, and a flange 14 against which a crystal 15 is pressed by flanged ring 16 that is frictionally fitted within the sleeve 12.

The casing 10 is apertured in the rear at 17 to receive a shoulder 18 on a cast or forged base or block 19. This base block 19 supports the entire mechanism of the gauge, including the dial and pointer, and is provided with a reduced threaded terminal 21, upon which is screwed a nut 22 with which to draw the face 23 of the precasting up against the inner wall of the casing 10, so as to firmly secure the same in the assembled relationship. This terminal has an axial fluid passage 20, and is adapted to receive a pressure pipe (not shown).

The face of the base block 19 is provided with an annular recess 24 which, with a diaphragm 25, forms a pressure chamber 26. The diaphragm seats on a shoulder 27 formed on the block, and has a flanged periphery 28 which rests against a wall 29 formed in the block. A diaphragm plate 31, apertured at 32, bears against the margin of the diaphragm, and is suitably secured in place in this relationship by means of solder or the like as at 33. The diaphragm preferably is made either of an extremely thin or unusually soft metal so as to offer very little resistance to fluid pressure, so that a very slight pressure, such as caused by a low head of water or oil will produce a deflection of the same. The diaphragm is thus seen to be very sensitive, and by virtue thereof, through the medium of the pointer mechanism, the gauge accurately indicates very low fluid pressures.

For protection of the diaphragm against abnormal pressure conditions, the deflection of the diaphragm is limited in one direction by the diaphragm plate 31, which has circular corrugations 34 therein to correspond to the circular corrugations 35 formed in the diaphragm; and the deflection of the diaphragm in the other direction (that is, to the right in Figure 2) is limited by means of a stop member 36 formed on the block in the pressure chamber. This arrangement permits an extremely soft or light diaphragm of great sensitivity to be used. To prevent the diaphragm from sealing off the pressure chamber from the pressure source transverse by-pass slots 37 are formed in the stop member 36.

Standards 38 extend from the front face of the base block and have shouldered pins 39 and 40 frictionally fitted in the extremities thereof. Pivoted at each of its ends on these pins is a yoke member 41, at the mid-portion of which is provided, as by striking a piece out of the metal, a finger or crank 42, which bears against the face of an actuator or plug 43. The plug 43 extends through the central aperture in the diaphragm plate 31, and is secured, as by soldering to the diaphragm 25.

One end of the yoke member has a lever 44 formed thereon. This lever slidably bears against a pointer 45 to cause the same to pivot and sweep over the scale in one direction to indicate the pressure to which the gauge is subjected. The pointer 45 is pivoted on a headed pin 46 which is set into the base block at 47. The scale above referred to is a dial 48 which is formed on a scale plate 49.

The pointer, along with the yoke member, is returned to zero position by means of a coil spring 51 which encircles pin 40. One end 52 of the spring bears against the block 19, and its other extremity 53 extends through an aperture 54 formed in the pointer.

The scale plate is secured to the base block by means of two pins 55 which have reduced end portions 56 which extend through and are frictionally held in openings 57 formed in the base block 19. The extremities of the reduced portions 56 of the pins 55 extend through openings 58 in the rear wall of the casing. These pins cooperating with the openings in the casing non-rotatively hold the base block in the casing and constitute the means above mentioned for preventing an incorrect positioning of the mechanism assembly relative to the casing. The scale plate held on the other end of the pins 55 by means of headed screws 59 passing through openings in the dial and threaded into the ends of the pins.

The diaphragm motion-regulating means comprises a spring arm 60 which may be formed of any suitable metal or alloy. One end of this spring arm is secured to the base block by means of a screw 61. The other end of this member is forked to provide two fingers 62 which freely embrace the reduced portion 63 of the plug 43 and bear against the shoulder 64 on the plug to thereby yieldingly resist outward movement of the diaphragm. This resistance compels the diaphragm to take a smooth regular motion and to result in an even scale calibration. It further assures the instantaneous return of the diaphragm to its normal position. The use of the resisting spring which takes the load of forces set up by fluid pressure, allows a diaphragm constructed of very light gauge or soft material to be used which, by virtue of its lightness offers but little resistance to deflection and thus is very sensitive to fluid pressures.

The means which I have provided for securing the gauge to the support comprises a U-shaped member 65 having legs 66. These legs are adapted to clamp, between them and the flange 11 on the casing 10, the automobile dash shown at 67. Means are provided for drawing the gauge casing and the U-shaped member together, comprising threaded bolts 68 extended through apertures 69 in the casing and openings 70 in the U-shaped member. These bolts are provided with heads 71 having flattened portions 72, which abut the inner wall of the casing and prevent rotation of the bolts. Nuts 73 are screwed on the bolts to produce the clamping action above mentioned.

In practice the automobile dash is provided with an aperture slightly larger than the cylindrical portion of the gauge casing 10. The gauge is then inserted in the opening and flange 11 is caused to abut the face of the dash. The U-shaped bracket member is then applied over the bolts 68, and the nuts 73 are turned on the bolts and taken up, thus drawing the casing back into the dash opening and firmly clamping the flange 11 against the face of the dash.

In order that the gauge casing may be accurately located with respect to the dash opening, a relatively large opening 74 is formed in the bracket 65, it being seen from this construction that the projection 21 passing through this opening will be allowed considerable free play therein for purposes of adjustment.

It will be seen from the foregoing that in a gauge constructed as above described, by removing the crystal assembly and unscrewing the nut 22 the entire gauge mechanism may be removed by drawing the same forwardly out of the gauge casing.

It also will be seen that the diaphragm, when moving to the right as shown in Figure 2 to its limit, will contact the stop 36 only in the region of the plug 43, forming a seat for the same whereby distortion of the very light or soft diaphragm is prevented.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims, are therefore intended to be embraced therein.

What is claimed and desired to be secured by United States Letters Patent is:

1. In a gauge, a casing having a rear wall; a mechanism supporting base having a rear face; a plurality of studs extending through apertures provided in said base and having means for securing a part of the gauge mechanism thereto, said studs being located on said rear face and projecting therebeyond; the rear wall of the casing being provided with apertures through which the said studs extend; and means for firmly clamping and holding the rear face of said base in contact with the rear wall of the casing; whereby, in assembling the parts, said studs cooperating with said apertures will definitely locate said base with respect to said casing.

2. In a gauge, a casing having a rear wall containing a large opening and small openings; a mechanism supporting base having a rear face; studs located in said rear face and extending through said small openings in said rear wall and means for firmly clamping and holding the rear face of said base in contact with the rear wall of the casing, said means comprising an integral threaded extension of the base projected through said large opening in the rear wall of the casing, and a nut turned thereon; whereby, in assembling the parts, said studs and small openings will definitely position said base with respect to said casing.

3. In a gauge, a casing; a base and means for detachably securing the same in said casing; said base having a rear face and a front face, the front face having a recess therein; a diaphragm having annular corrugations provided therein, and a diaphragm plate having annular corrugations corresponding with the corrugations in said diaphragm and positioned in said recess in superposed relationship, the bottom of the recess and the diaphragm defining a pressure chamber; and a sealing material located about the margin of the said plate and filling the space between the side wall of the recess, the edge of the diaphragm and the plate.

4. In a gauge, a casing having an opening in the rear wall thereof; a base having front and rear faces; the rear face of the same having an integral boss projecting through said opening in the rear wall of the casing; the front face of the base having a recess therein and a central boss extending into said recess and having a diaphragm provided with annular corrugations mounted thereover, whereby the diaphragm and recess define a pressure chamber and cooperates with the central boss to prevent excessive back flexing of the diaphragm; and a duct formed in said base in communication with the pressure chamber and passing through the said boss; a plate having corrugations corresponding to the corrugations in the diaphragm mounted thereover, whereby excessive forward flexing of the diaphragm is prevented and means securing the base in the casing.

5. In a gauge, a casing; a pressure chamber and a diaphragm cooperating therewith, the diaphragm having annular corrugations therein; a stop plate provided with corrugations corresponding to the corrugations of said diaphragm mounted thereover, said stop plate having a central hole formed therein, a shouldered plug mounted on said diaphragm and projecting through said central hole, a compensating spring located within the casing and bearing against said shouldered plug to oppose movement of said diaphragm in response to fluid pressure whereby the diaphragm may be made of much softer or lighter material than would be possible if said spring were absent.

6. In a gauge, a diaphragm; a shouldered actuator mounted on said diaphragm; a spring member having one end terminating in a fork defining two fingers, said fingers being adapted to contact and bear against said shouldered actuator; and means securing said spring in operative relation to said actuator.

7. In a gauge, a base block having a diaphragm, said block having two standards projecting from its face; and a yoke member pivoted at each end on a pin provided on each standard, said yoke member being provided at its mid-section with a bendable crank for adjustable cooperation with the diaphragm.

8. In a gauge, a base block having a diaphragm and a pointer associated therewith, said block having two standards projecting from a face thereof; and a yoke member pivoted at its ends on said standards, said yoke member being provided at its midsection with a bendable crank for adjustable cooperation with the diaphragm, and at one end thereof with a lever arm for cooperation with the pointer.

9. In a gauge, a base block and a pointer associated therewith; two standards projecting from said base block; a pin mounted in each of staid standards and being disposed substantially in axial alignment; a yoke member pivoted on said pins, a lever projecting from one end of said yoke member and adapted to actuate said pointer; a torsion spring encircling one of said pins, one end of said spring bearing against said base block and the other end thereof bearing against said pointer and adapted to return the same to zero position.

10. In a gauge, a casing having an opening, a base block having an aperture mounted in said casing, a scale plate mounted on said base block by means of a shouldered pin, the reduced end of said pin extending through said aperture in said base block and projecting beyond said base block into said opening in said casing.

PAUL GAISER.